United States Patent [19]

Braitberg

[11] 4,081,845

[45] Mar. 28, 1978

[54] MAGNETIC RECORDING WITH BIAS AND DATA MIXING CIRCUIT

[75] Inventor: Michael F. Braitberg, Larkspur, Colo.

[73] Assignee: Honeywell Inc., Minneapolis, Minn.

[21] Appl. No.: 700,830

[22] Filed: Jun. 29, 1976

[51] Int. Cl.$^2$ .............................................. G11B 5/02
[52] U.S. Cl. ........................................ 360/68; 360/66
[58] Field of Search ............................ 360/68, 66, 67; 346/74.1

[56] References Cited

U.S. PATENT DOCUMENTS

| 3,324,250 | 6/1967 | Skov | 360/68 |
|---|---|---|---|
| 3,766,329 | 10/1973 | Katoh | 360/68 |
| 3,806,828 | 4/1974 | Johnson | 360/68 |
| 4,015,290 | 3/1977 | Bowers | 360/68 |

OTHER PUBLICATIONS

IBM Technical Disclosure Bulletin, vol. 18, No. 11, 4/76, p. 3540, Record Current Driver for Battery Op. Rec. by A. Higgenbotham.

*Primary Examiner*—Jay P. Lucas
*Attorney, Agent, or Firm*—L. J. Marhoefer; L. D. Burton

[57] ABSTRACT

A magnetic recording head driving circuit includes a single operational differential amplifier which mixes the bias signals with the data signals, the signal level of the two signals being separately controlled. The output of the amplifier is applied to the recording head through an impedance matching network. The impedance matching network converts the relatively high inductive impedance of the head to a substantially and effectively resistive load, matching the output impedance of the amplifier at the frequency of the bias signal.

7 Claims, 1 Drawing Figure

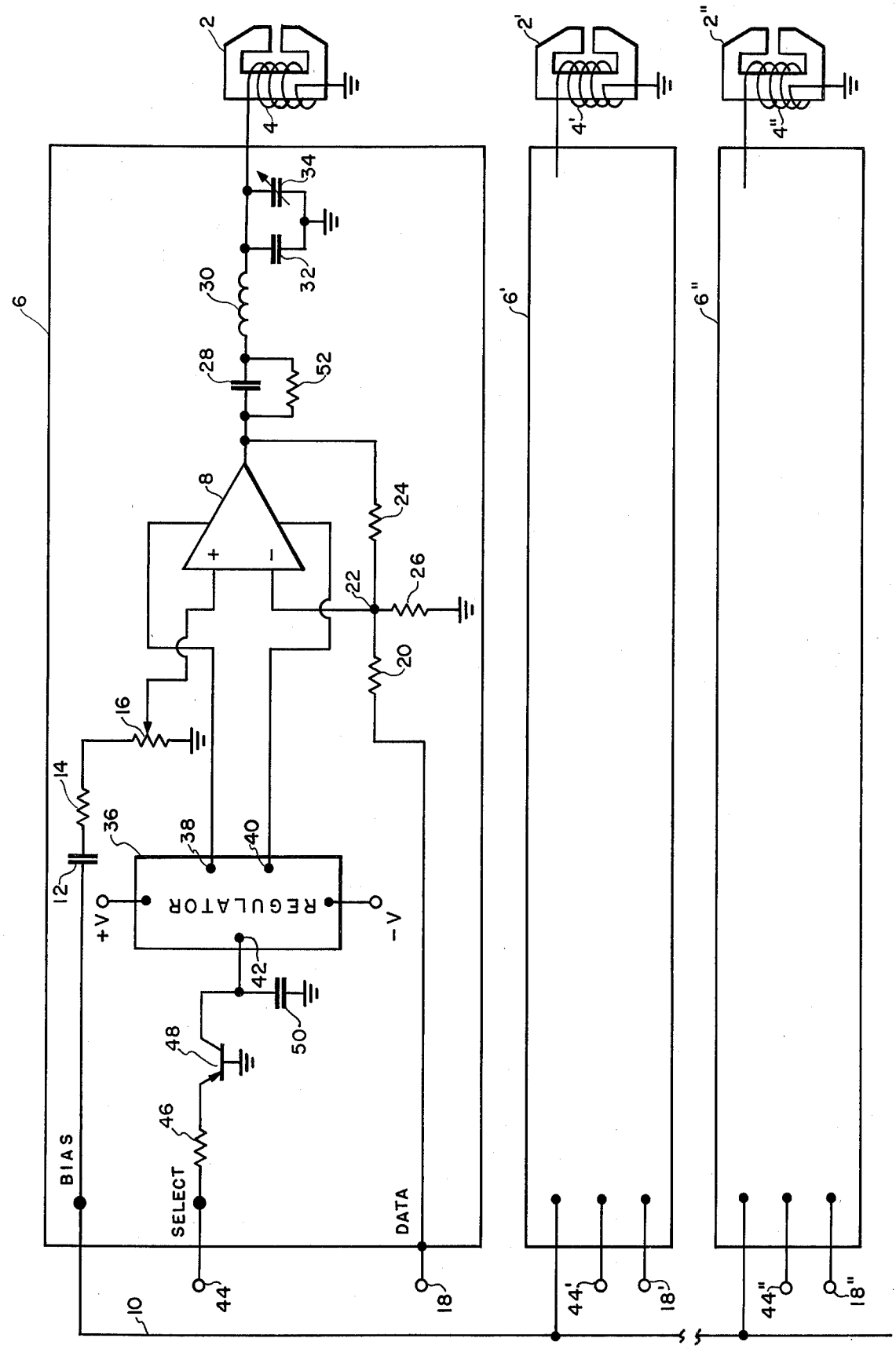

4,081,845

MAGNETIC RECORDING WITH BIAS AND DATA MIXING CIRCUIT

BACKGROUND OF THE INVENTION

1. Field of the Invention

The present invention relates to magnetic recording apparatus, and more particularly to an improved bias control arrangement.

2. Description of the Prior Art

In the direct recording of signals on magnetic tape, it is usually required that the intelligence signals to be recorded be superimposed upon a high frequency bias signal. That bias signal, for obvious reasons, is selected to be of a frequency which is three to five times higher than the highest frequency anticipated in the intelligence signal. With intelligence or data signals having a frequency of up to 4 MHz, the bias signal must be from 12 to 20 MHz. In providing circuitry for accommodating the wide band-width for the recording of the data signals with low distortions thereof and, at the same time, effect a transfer of substantial power from the bias signal has, heretofore, entailed relatively complex circuitry. An example of such a circuit is shown in U.S. Pat. No. 3,381,098. In that patent, there is provided separate amplification channels for the bias and data signals as well as separate coupling transformers.

Because of the coupling problems and the relatively low efficiency thereof, it has been necessary to provide a relatively large amount of power in the head driving bias amplifier. That means, since the coupling to the head is inefficient, that the driving amplifier must be capable of dissipating much of the power developed by that amplifier.

Additionally, when one source of high frequency bias is used to drive a plurality of recording heads, care must be taken to avoid the introduction of cross-talk between heads by reflection back through the bias channels. To this end, bias traps or filters are used; but such traps are limited in scope.

SUMMARY OF THE INVENTION

It is, accordingly, an object of the present invention to provide an improved magnetic recording apparatus.

It is another object of the present invention to provide a magnetic recording apparatus with improved bias control means.

It is a further object of the present invention to provide an improved magnetic recording apparatus as set forth which includes means to prevent data signals from being reflected back into a common power supply circuit, the common bias supply circuit.

It is yet another object to provide an improved magnetic recording apparatus as set forth which includes means for remotely selecting recording channels.

it is a still further object of the present invention to provide an improved magnetic recording apparatus which features improved simplicity and economy of structure.

In accomplishing these and other objects, there has been provided, in accordance with the present invention, a driving circuit for a magnetic record head. A single operational differential amplifier mixes the bias signal with the data signal, the signal level of the two signals being separately controlled. The output of the amplifier is applied to the head through an impedance matching network. The impedance matching network converts the relatively high inductive impedance of the head to a substantially and effectively resistive load, matching the output impedance of the amplifier at the frequency of the bias signal.

BRIEF DESCRIPTION OF THE DRAWING

A better understanding of the present invention may be had from the following detailed description when read in the light of the accompanying drawing in which the single FIGURE is a schematic diagram of a circuit embodying the present invention.

DETAILED DESCRIPTION OF THE PREFERRED EMBODIMENT

Referring now to the drawing in more detail, there is shown in the single FIGURE a recording head 2 having an exciting winding 4 thereon. A head driving circuit 6 is connected to energize the exciting winding of the recording head. The driving circuit 6 includes a differential input operational amplifier 8. In a circuit constructed in accordance with the present invention, the operational amplifier 8 was of the type identified as LH0032 amplifier manufactured by the National Semiconductor Corporation. A first input or bias signal is applied to the non-inverting input terminal of the amplifier 8 from a bias bus 10 through a D.C. blocking capacitor 12, a series resistor 14 and a slidewire resistor 16. It will be noted that there are a plurality of head driver circuits 6, 6', 6'' each driving the exciting coil of a separate record head 2, 2', 2'', and each is connected to the common bias bus 10. A second input or data signal is applied to the inverting input terminal of the amplifier 8 from a source of data signals by way of an input terminal 18, through an input resistor 20 to a summing junction 22. A feedback resistor 24 connected between the output terminal of the amplifier 8 and the summing junction 22, together with a resistor 26 connected between the summing junction 22 and ground, and in conjunction with the input resistor 20 determine the signal gain of the amplifier 8.

The output terminal of the amplifier is connected through a series capacitor 28 and a series inductor 30 to one end of the exciting winding 4 of the head 2. The junction between the winding 30 and the winding 4 is connected through a first capacitor 32 to ground. A second variable capacitor 34 is connected in parallel with the capacitor 32. The capacitor 32 and, optionally, the capacitor 34 constitute a capacitive impedance connected across the recording head.

The amplifier 8 is energized from a voltage supply indicated as + and −V, through a voltage regulator circuit 36. Again, in the exemplary embodiment previously referred to, the voltage regulator was of the type identified as LM325N manufactured by National Semiconductor Corporation. The regulator is a tracking type regulator designed to provide balanced positive and negative output voltages at the output terminals 38 and 40 thereof. There is also provided a reference input terminal 42. That terminal 42 is connected to a head driver select terminal 44 through a series resistor 46 and the emitter/collector path of a transistor 48. A capacitor 50 is connected between the terminal 42 and ground.

OPERATION OF THE PREFERRED EMBODIMENT

In the operation of the head driver circuit, the high frequency bias signal is applied from the bus 10 to the noninverting input of the amplifier 8. The magnitude of that signal is controlled by the positioning of the slider along the slidewire resistor 16 whereby to provide a predetermined high frequency current signal to the winding 4 of the recording head 2. The selected frequency for that bias signal is determined by two determinative conditions. A first of these conditions is the maximum frequency of the data signal to be recorded. As previously noted, the frequency of the bias signal should be from three to five times higher than the highest frequency of the data signal to be recorded. The other condition is the nature of the structure of the core of the recording head. With relatively low performance type of heads made of laminated magnetic metal cores a higher current is required for the bias signal but a relatively lower bias frequency is used, on the order of maximum of 3 MHz, as the bias signal. On the other hand, the high performance heads, constructed of ferrite material require less power but also require a much higher bias frequency. Thus, the higher frequency data signals, with a maximum frequency of 4 MHz, will be used with the ferrite type recording head, the bias frequency being of the order of 12 to 20 MHz.

Traditionally, the coupling between the amplifier 8 and the recording head 2 is highly inefficient. In order to improve the efficiency of the coupling between the amplifier 8 and the recording head 2, there has been provided, in accordance with the present invention, an impedance matching network. The impedance matching network includes the capacitor 28, the inductor 30 and the capacitors 32 and 34, together with the inductive impedance of the winding 4 of the head 2. The values of the elements in the impedance matching network are so chosen that, at the selected bias frequency, the load on the amplifier appears as a nearly purely resistive load or very slightly inductive load with an effective resistive impedance that substantially matches the output impedance of the amplifier 8. With the loading on the amplifier effectively matching the output impedance of the amplifier 8, a maximum energy transfer between the amplifier and the recording head is achieved. That, in turn, reduces to a minimum the amount of energy that must be dissipated within the amplifier 8, itself. The data signal applied to the input terminal 18 of the head driver circuit and coupled to the inverting input of the amplifier 8 through the resistance network including the resistors 20 and 24 and 26 is superimposed upon the bias signal applied to the recording head 2. Since the amplifier 8 is of a differential amplifier configuration, the application of the bias signal on one of the input terminals and the data signal on the other of the input terminals introduces no reflected interaction of the signals back into the source circuits. The amplifier effectively isolates the two input circuits, preventing the reflection of data signals back into the common bias signal circuit, a condition which could otherwise produce undesirable cross-talk between channels.

In the circuit thus described, it will be noted that a resistor 52 is positioned to bypass the capacitor 28 in the impedance matching network. The resistor 52 effectively provides a low impedance bypass for the lower frequency data signals, providing a substantially constant current value for those lower frequency data signals. As the frequency of the data signals increases the effective impedance of the capacitor 28 diminishes relative to the impedance of the resistor 52, providing a desirable signal boost for the higher frequency data signals to effectively compensate for high frequency losses in the magnetic head. The resistor 52, in turn, does not affect the impedance match characteristic for the high frequency bias signal.

The energization of the amplifier 8 through the voltage regulator 36 provides, first, an isolating buffer whereby to prevent cross-talk between the several channels of the recording system due to reflection back through the power supply common to all the recording channels. Additionally, it was noted that the voltage regulator is provided with a reference input terminal 42. That regulator is so arranged that an enable signal applied to the reference terminal 42 establishes the magnitude of the energizing voltage or current supplied to the terminals 38 and 40, whereby to energize the amplifier 8. When, however, the terminal 42 is clamped to ground, as by an external signal applied to the select input terminal 44 through the resistors 46 and the transistor 48, the output energizing current from the terminals 38 and 40 are cut off. With the energization of the amplifier 8 from the regulator 36 in a cutoff condition, no signal, either data or bias signal, will be issued at the output of the amplifier 8. Thus, there is provided a means for effecting channel selection among the several record channels by external programmatic control and without the need for switching in the data or bias channels.

Inasmuch as the impedance matching network is in the form of a low-pass filter, higher order harmonics of the bias signal are effectively blocked, thereby avoiding distortions and interference problems usually incident to the appearance of such harmonics. Further, since the capacitive impedance across the recording head is relatively large, stray capacity variations in the leads, the housing and/or the magnetic heads is effectively swamped out and has no significant effect on the recorded signals.

As thus constituted, it is apparent that there has been provided an improved magnetic record head driver arrangement wherein a single operational amplifier provides driving amplification for both a high frequency bias signal and the data signal, wherein impedance matching means is provided for the output of the amplifier whereby to effect a transfer of energy at a maximum efficiency from the amplifier to the record head, wherein the impedance matching network also accomplishes a frequency responsive high end boost for the data signals, and which driver circuit permits a remotely controlled channel selection as between several recording channels.

The embodiments of the invention in which an exclusive property or privilege is claimed are defined as follows:

1. A magnetic recording head driving circuit comprising
    a differential amplifier having a first and second input terminal and an output terminal,
    means for applying a high frequency bias signal to said first input terminal of said amplifier,
    means for applying a data signal to said second input terminal of said amplifier whereby to superimpose said data signal on said bias signal at said output terminal of said amplifier, and
    an impedance matching network connected between said output terminal and a recording head, said impedance matching network being configured to match the load impedance, including the recording head, on the amplifier to the output impedance of the amplifier at the frequency of the high frequency bias signal whereby to maximize the efficiency of the transfer of energy from the amplifier to the recording head at the bias signal frequency.

2. A magnetic recording head driving circuit comprising a differential amplifier having a first and a second input terminal and an output terminal, means for applying a high frequency bias signal to said first input terminal of said amplifier, means for applying a data signal to said second input terminal of said amplifier whereby to superimpose said data signal on said bias signal at said output terminal of said amplifier, and an impedance matching network connected between said output terminal and a recording head, said impedance matching network including a capacitor and an inductor serially connected between said output terminal and said recording head and a capacitive impedance means connected in shunt across said recording head, said impedance matching network being configured to match the load impedance, including that of the recording head, to the output impedance of the amplifier at the frequency of the high frequency bias signal whereby to maximize the efficiency of the transfer of energy from the amplifier to the recording head at the bias signal frequency.

3. A magnetic recording head driving circuit as set forth in claim 2 and characterized by the inclusion of energizing means for said amplifier, said energizing means including a pair of source terminals for connection to a source of energizing voltage, a pair of energization terminals on said amplifier, and a voltage regulator means connected between said source terminals and said energization terminals, said voltage regulator means comprising an isolating buffer to prevent the reflection of signals from said driving circuit back into the source of energizing voltage.

4. A magnetic recording head driving circuit as set forth in claim 3 wherein said voltage regulator means includes control signal responsive means for controlling the output of said regulator means, and means for applying a control signal to said voltage regulator means to selectively enable or cutoff the energization of said amplifier.

5. A magnetic recording head driving circuit comprising a differential amplifier having a first and a second input terminal and an output terminal, means for applying a high frequency bias signal to said first input terminal of said amplifier, means for applying a data signal to said second input terminal of said amplifier whereby to superimpose said data signal on said bias signal at said output terminal of said amplifier, an impedance matching network connected between said output terminal and a recording head, said impedance matching network including a capacitor and an inductor serially connected between said output terminal and said recording head and a capacitive impedance means connected in shunt across said recording head, said impedance matching network being configured to match the bad impedance, including that of the recording head, to the output impedance of the amplifier at the frequency of the high frequency bias signal whereby to maximize the transfer of energy from the amplifier to the recording head at the bias signal frequency, and a resistor connected in shunt with said first-mentioned capacitor whereby to so characterize the transfer of energy from said amplifier to said recording head in the range of frequencies corresponding to said data signals that a substantially constant current is provided to said recording head for a lower range of frequencies for said data signals and to provide a rising current characteristic for data signals in the higher frequency range.

6. A magnetic recording system comprising a plurality of recording channels, each recording channel including a differential amplifier having a first and a second input terminal and an output terminal, means including a common bus for applying a high frequency bias signal to said first input terminal of said amplifier of each of said channels, means for applying separate data signals to said second input terminal of each of said amplifiers whereby to superimpose said data signals on said bias signal at said output terminal of each of said amplifiers, each of said channels further including an impedance matching network connected between said output terminal and an associated recording head, said impedance matching network being configured to match the load impedance, including that of the associated recording head, to the output impedance of said amplifier at the frequency of the high frequency bias signal whereby to maximize the efficiency of the transfer of energy from said amplifier to the associated recording head at the bias signal frequency, each of said channels further including means for energizing said amplifiers, said energizing means including a pair of source terminals for connection to a common source of energizing voltage, a pair of energizing terminals on said amplifier, and a voltage regulator means connected between said source terminals and said energizing terminals, said voltage regulator means comprising an isolating buffer to prevent the reflection of data signals from each of said plurality of driving circuits back into the common source of energizing voltage thereby to avoid cross-talk as between the channels.

7. A magnetic recording system as set forth in claim 6 wherein said voltage regulator means in each of said channels include control signal responsive means for controlling the output of said regulator means, and means for selectively applying control signals to said voltage regulator means, separately, to selectively enable or cutoff the energization of said amplifiers.

* * * * *